Figure 1:
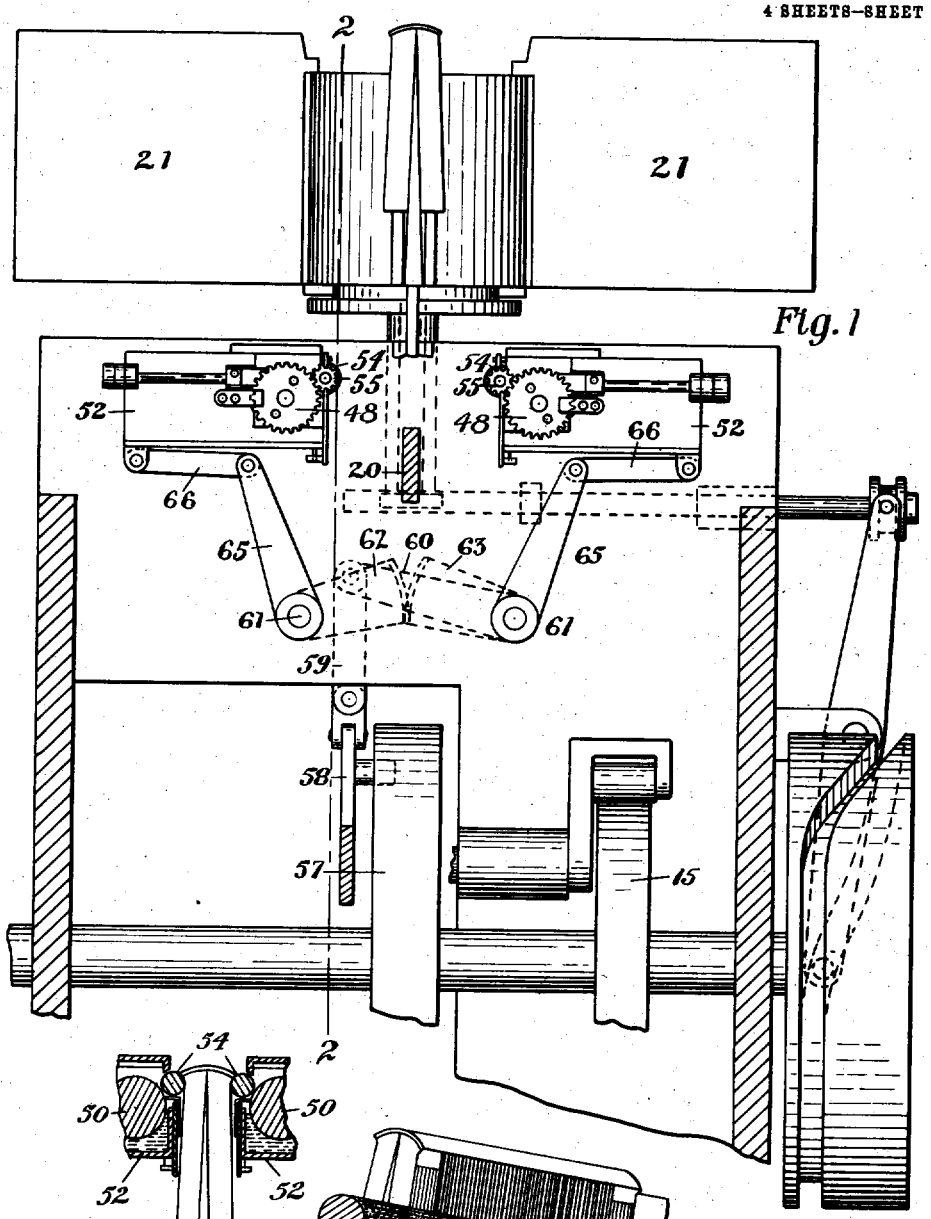

W. L. NORTON.

CASING-IN MACHINE FOR BOOKS.

APPLICATION FILED MAY 31, 1911.

Reissued Apr. 30, 1912.

13,412.

4 SHEETS—SHEET 1.

Witnesses
H. B. Davis.
J. L. O'neill

Inventor
Wm L. Norton
by Poyet & Harriman
Attys

COLUMBIA PLANOGRAPH CO., WASHINGTON, D. C

W. L. NORTON.

CASING-IN MACHINE FOR BOOKS.

APPLICATION FILED MAY 31, 1911.

Reissued Apr. 30, 1912.

13,412.

4 SHEETS—SHEET 2.

Witnesses

H. B. Davis.

J. L. O'neill

Inventor

Wm. L. Norton by Roger Hammar

Atty's

COLUMBIA PLANOGRAPH CO., WASHINGTON, D. C.

W. L. NORTON.

CASING-IN MACHINE FOR BOOKS.

APPLICATION FILED MAY 31, 1911.

Reissued Apr. 30, 1912.

13,412.

4 SHEETS—SHEET 3.

Witnesses
H. B. Davis.
J. L. O'Neill

Inventor
Wm. L. Norton
By Hoyne & Hamilton
Attys

COLUMBIA PLANOGRAPH CO., WASHINGTON, D. C.

W. L. NORTON.

CASING-IN MACHINE FOR BOOKS.

APPLICATION FILED MAY 31, 1911.

Reissued Apr. 30, 1912.

13,412.

4 SHEETS—SHEET 4.

Witnesses:

H. B. Davis.

H. McDonald

Inventor:

William L. Norton by Mayo & Hamman attys.

COLUMBIA PLANOGRAPH CO., WASHINGTON, D. C.

UNITED STATES PATENT OFFICE.

WILLIAM L. NORTON, OF BOSTON, MASSACHUSETTS.

CASING-IN MACHINE FOR BOOKS.

13,412. Specification of Reissued Letters Patent. Reissued Apr. 30, 1912.

Original No. 988,651, dated April 4, 1911, Serial No. 582,624. Application for reissue filed May 31, 1911. Serial No. 630,531.

*To all whom it may concern:*

Be it known that I, WILLIAM L. NORTON, residing at Boston, in the county of Suffolk and State of Massachusetts, have invented an Improvement in Casing-In Machines for Books, of which the following is a specification.

This invention relates to machines for casing-in books of the type shown in Letters Patent No. 690,959; and No. 716,959, and particularly to the pasting-devices. In the machine shown in said Letters Patent the paste-rolls are arranged to be moved in one direction to apply paste to the leaves of a book while the book is being moved in an upward direction between them, and to be moved in the opposite direction a short distance, preparatory to applying paste to the next book for the purpose of accumulating on the paste-applying rolls thick layers of paste to be applied to the book at the joints at the beginning of the pasting operation. The thick layer of paste which is accumulated on each paste applying-roll is of an even thickness throughout the length of the roll, and as a result the same quantity of paste is applied to the joints from end to end of the book. When the case is applied to the pasted book and the "cased-in" or covered book is pressed some paste is squeezed out at each end of the book, at the joints, which is very objectionable. To overcome this difficulty is the essential object of this invention.

The invention consists in the provision of means whereby there is accumulated on the paste applying-roll, prior to beginning of the pasting operation, thin layers of paste at portions thereof adapted to extend over the ends of the joint of the book, and a thick layer of paste therebetween, so that while the requisite amount of paste will be applied to the joint, yet at the ends thereof no surplus paste will be applied which will be squeezed out when the cased-in book is pressed. Also, in the machine shown in said patent the thin layer of paste which is distributed on each paste-applying-roll, to be applied to the leaves of the book, is also of an even thickness throughout its length, and this even distribution of the paste is also objectionable for the reason that too much paste is applied to the ends of the leaves of the book. This difficulty is also overcome by the employment of the paste-distributing means embodying this invention.

Figure 7:
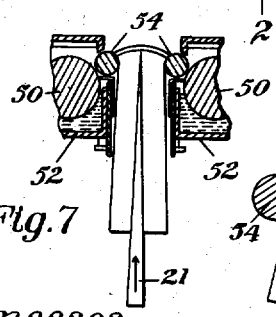
Figure 8:
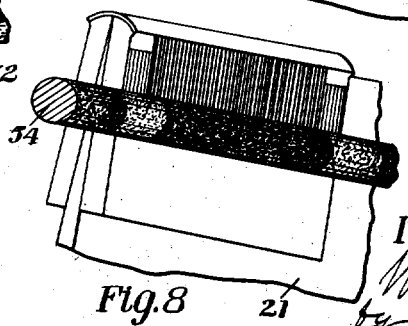
Figures 2, 3:
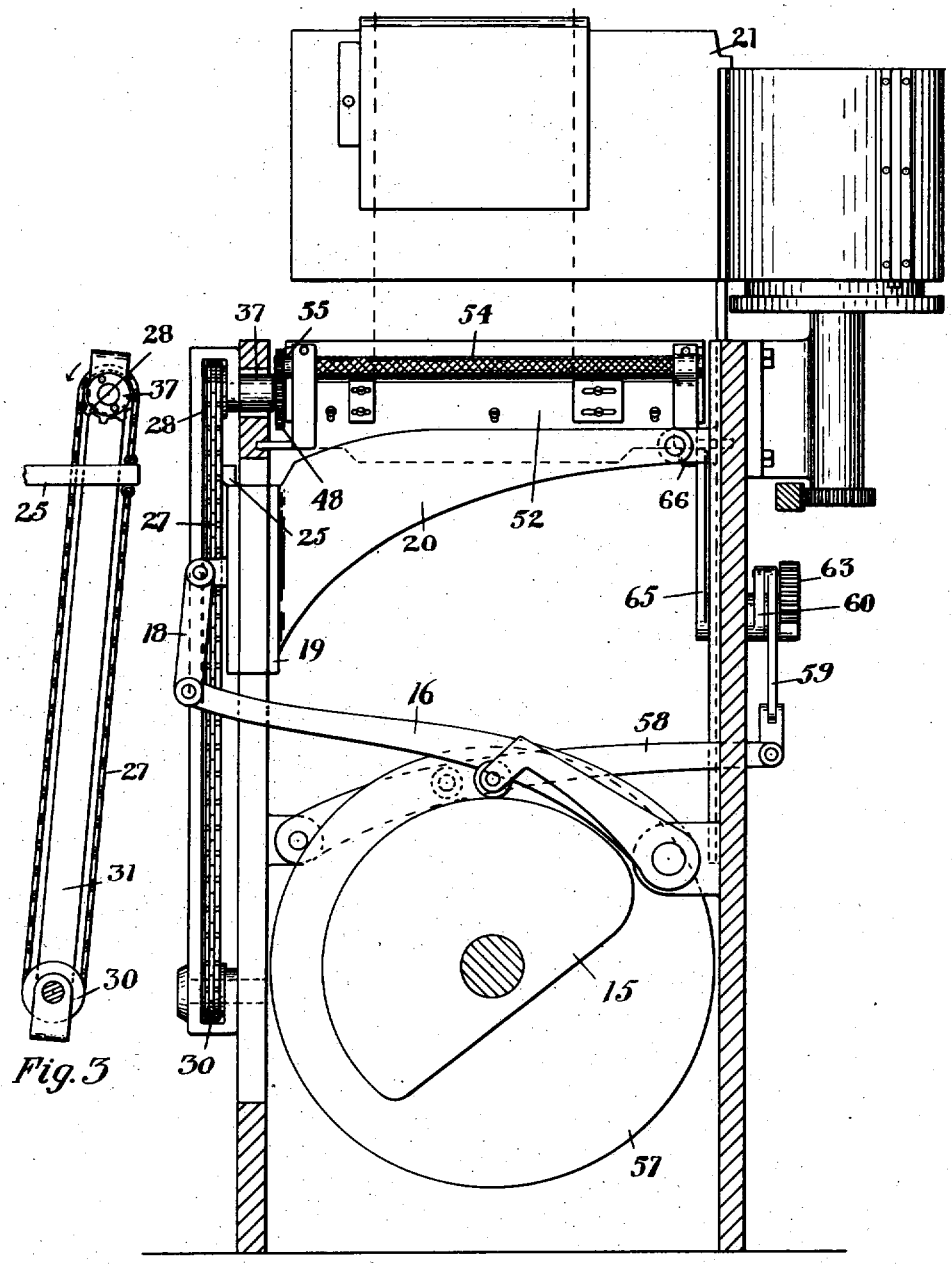
Figure 4:
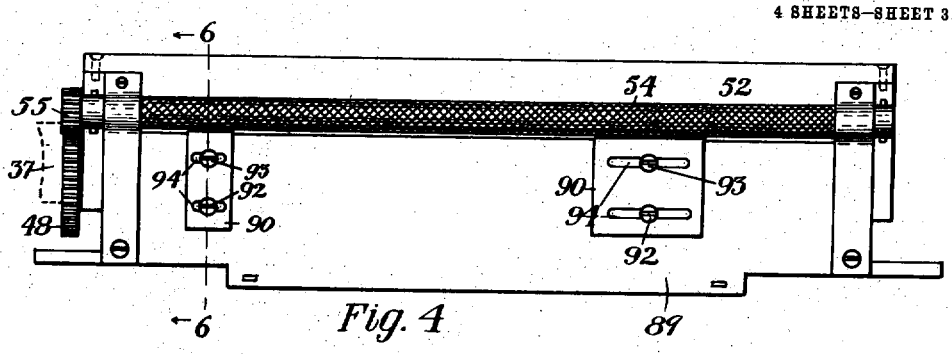
Figure 5:
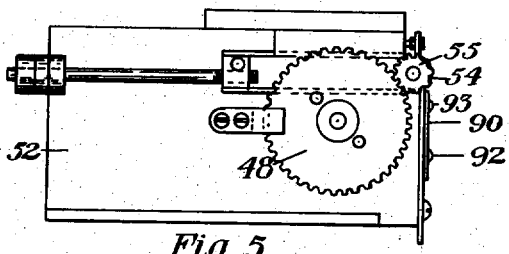
Figure 6:
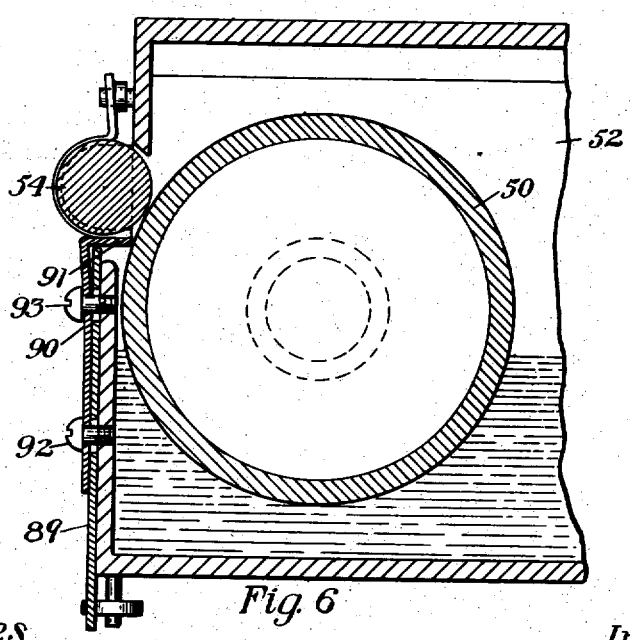
Figure 9:
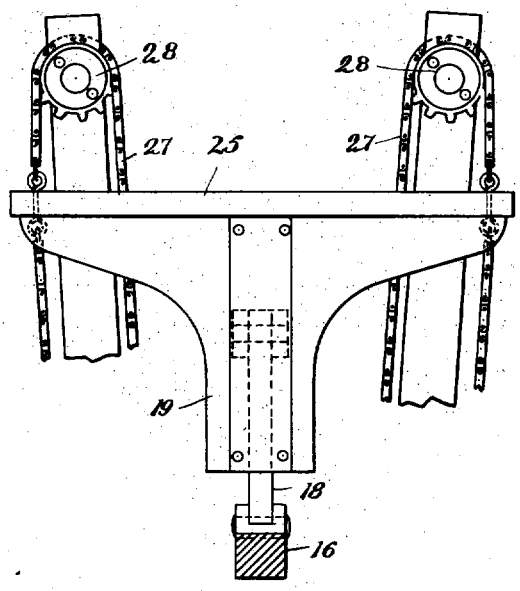
Figure 10:
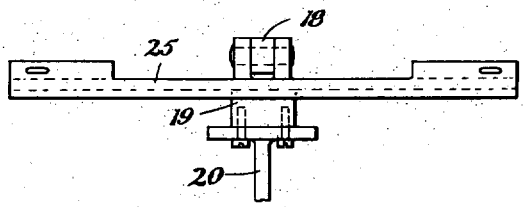

Figure 1 is a vertical section of a casing-in machine having paste-boxes containing pasting-rolls and having scrapers embodying this invention for engaging certain portions of the pasting-rolls. Fig. 2 is a vertical section of the machine shown in Fig. 1, taken on the dotted line 2—2. Fig. 3 is a detail showing a sprocket-chain for driving the pasting-rolls. Fig. 4 is an enlarged front elevation of one of the paste-boxes. Fig. 5 is an end view of the paste-box shown in Fig. 4. Fig. 6 is an enlarged transverse sectional detail of the paste-rolls and scraper embodying this invention taken on the dotted line 6—6, Fig. 4. Fig. 7 is a sectional detail showing the paste applying-rolls in engagement with the joints of a book. Fig. 8 is a detail showing a book and a paste applying-roll in engagement with it. Figs. 9 and 10 are detail views of portions of the sprocket-chains and means to operate them.

Referring to the drawings which represent the essential portions of the machine of the aforesaid patents, 21 represents a vertically movable book-supporting plate, which is adapted to be moved up and down between paste applying-rolls, and 20 an arm which extends from a vertically sliding frame 19 for moving said supporting-plate. Said frame 19 is connected by a link 18 with a pivoted arm 16 which is moved by a cam 15.

52 represents a paste-box, two of which are employed, and each box contains a paste distributing-roll 50, and a paste applying-roll 54 arranged close to the distributing-roll. The paste-boxes are disposed with their paste applying-rolls facing each other, to engage the leaves of a book on the book-support which passes between them and they are movable toward and from each other.

66 represents a link loosely connected to one of the paste-boxes which is connected to the upper end of an arm 65, pivoted at 61, and having a toothed sector 62 connected with it, which engages a like toothed-sector 63, secured to a like pivoted arm 65, which is connected by a link 66 to the other paste-box.

60 represents an arm connected with one of the aforesaid arms 65 which is connected by a link 59 with a pivoted arm 58, engaging a cam 57. As the cam 57 revolves the paste-boxes are moved toward and from each other. The paste distributing-rolls and the paste applying-rolls are positively rotated and the means employed for rotating them are such that said rolls are positively rotated in one direction to apply paste to the leaves of the book, when the book-support is being raised between them, and are afterward positively rotated in the opposite direction, although but a short distance prior to engaging the next book. Each paste applying-roll 54 has secured to it a pinion 55, which is engaged by a toothed gear 48, secured to its coöperating paste distributing-roll, and each gear 48 is engaged by a clutch-member 37, which has connected with it a sprocket-wheel 28 over which a sprocket-chain 27 passes which extends downward over an idle wheel 30. Said chains are moved first in one direction and then in the opposite direction and are both connected to a rib 25 on the sliding frame 19, for the accomplishment of this result, see Figs. 2, 3, 9 and 10. When moved in one direction they operate to positively rotate the paste distributing-rolls and paste applying-rolls in one direction to apply paste to the book and when moved in the opposite direction return to normal position.

As here shown the journals of the wheels 30 over which the sprocket-chains 27 pass are supported in fixed bearings, and the journals of the sprocket-wheels 28 are supported by means connected with the paste-boxes and are therefore movable, and as the paste-boxes are moved back and forth the upper ends of the chains are swung and such movement gives a short reverse movement to the distributing-rolls to accumulate on the paste applying-rolls the requisite amount of paste to be used at the beginning of the pasting operation.

The aforesaid parts are all substantially the same as in the patents refered to, or at least are not of my invention and are here shown merely for illustration.

In view of the fact that, as before stated, the quantity of paste delivered is too great at the ends of the book, means are herein provided for preventing the applying-roll, when turned backward a short distance, from receiving a thick layer of paste at such portions thereof as come opposite the ends of the book, so that along such portions only thin layers of paste will be delivered, and such means also provides for delivering very thin layers of paste to the applying-roll at such portions, when said applying roll is turned forward, so that on both movements of the applying-roll the portions thereof which engage the ends of the leaves of the book will have thereon thinner layers of paste than the portion therebetween.

As a simple manner of carrying out this invention two scrapers are arranged under and adjacent the applying-roll, at two widely separated points, which are adjustable, whereby their positions longitudinally and also transversely with respect to said roll may be charged. Said scrapers are made alike, and, as here shown, consist of plates 90 attached to the outside of the front wall of the paste-box, over the plate 89 and beneath the applying-roll, and having their upper ends extended above said plate and wall, and bent inward as lips over the top of said plate and wall, toward the distributing-roll. Said plates are preferably resiliently mounted for a slight adjustment transversely with respect to the applying-roll, being securely attached at their lower ends by screws 92, and yieldingly attached at their upper ends by screws 93.

The plates 90 are provided with transverse slots 94 permitting adjustment along the wall of the paste-box longitudinally with respect to the applying-roll, to provide for removing the paste from the applying-roll at different portions thereof, as may be required, for books of different lengths.

The amount of paste which the distributing-roll is permitted to deliver along the portions thereof co-extensive with the scrapers, is controlled by the adjusting-screws which regulate the position of the scrapers transversely with respect to the applying-roll.

The applying-rolls revolve in the direction of movement of the book during the upward stroke of the book-supporting plate, and the scrapers reduce the thickness of the layers of paste on said rolls during such time, and then said rolls reverse, making, however, but a partial turn at the beginning of the downward movement of said book-supporting plate and then come to rest. During such partial reverse revolution of the applying-rolls layers of paste are delivered thereto, but, the layers of paste on said rolls at the beginning of such reverse movement are reduced in thickness at the end portions and thicker therebetween, and the new or additional layers delivered to them during the partial revolution aforesaid, merely increases the thickness of the layers from end to end of the roll, so that at the moment they come to rest the layers of paste deposited on them are still reduced in thickness at the end portions. Thus the scrapers form a coöperative part of the distributing-means for the paste, acting in conjunction with the distributing-roll.

So far as my invention is concerned I do not limit it to its employment in connection with the machine, which is here shown merely for the sake of illustrating this invention.

I claim:—

1. In a casing-in machine for books, the combination of a paste-box, a paste-applying-roll, and a paste-distributing-means arranged to deliver to the paste-applying-roll, at two widely separated portions thereof, thin layers of paste, and a thicker layer of paste therebetween, substantially as described.

2. In a casing-in machine for books, the combination of a paste-box containing a paste-distributing-roll and a paste-applying-roll arranged close to the paste distributing-roll, means for revolving said rolls in one direction to apply paste to the book and in the other direction to accumulate paste on the applying-roll, and two scrapers arranged under and adjacent the paste applying-roll at widely separated points, corresponding to the ends of the book to be pasted, which reduce the thickness of the layer of paste which is delivered to the paste applying-roll at such portions thereof, substantially as described.

WILLIAM L. NORTON.

Witnesses:
B. J. Noyes,
H. B. Davis.

Copies of this patent may be obtained for five cents each, by addressing the "Commissioner of Patents, Washington, D. C."